US009137260B2

(12) United States Patent
Gehrig, Jr.

(10) Patent No.: US 9,137,260 B2
(45) Date of Patent: Sep. 15, 2015

(54) DETECTION OF SPOOFING OF REMOTE CLIENT SYSTEM INFORMATION

(71) Applicant: BLUECAVA, INC., Irvine, CA (US)

(72) Inventor: Alfred P. Gehrig, Jr., Mission Viejo, CA (US)

(73) Assignee: BLUECAVA, INC., Irvine, CA (US)

( * ) Notice: Subject to any disclaimer, the term of this patent is extended or adjusted under 35 U.S.C. 154(b) by 0 days.

(21) Appl. No.: 14/036,547

(22) Filed: Sep. 25, 2013

(65) Prior Publication Data

US 2014/0026220 A1    Jan. 23, 2014

Related U.S. Application Data

(63) Continuation of application No. PCT/US2012/033786, filed on Apr. 16, 2012.

(60) Provisional application No. 61/476,206, filed on Apr. 15, 2011.

(51) Int. Cl.
*H04L 29/06* (2006.01)
*G06F 21/44* (2013.01)

(52) U.S. Cl.
CPC ............ *H04L 63/1483* (2013.01); *G06F 21/44* (2013.01); *H04L 63/0876* (2013.01); *H04L 63/1416* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 2005/0187890 A1 | 8/2005 | Sullivan | |
| 2007/0143073 A1 | 6/2007 | Richardson | |
| 2007/0239604 A1* | 10/2007 | O'Connell et al. | 705/50 |
| 2010/0192201 A1* | 7/2010 | Shimoni et al. | 726/3 |
| 2010/0250944 A1 | 9/2010 | Suzuki | |
| 2010/0333213 A1* | 12/2010 | Etchegoyen | 726/29 |
| 2011/0030055 A1 | 2/2011 | Balay et al. | |
| 2011/0271109 A1* | 11/2011 | Schilling et al. | 713/168 |
| 2012/0090030 A1* | 4/2012 | Rapaport et al. | 726/23 |

FOREIGN PATENT DOCUMENTS

| | | |
|---|---|---|
| EP | 2 312 483 | 4/2011 |
| EP | 2 323 062 | 5/2011 |

(Continued)

OTHER PUBLICATIONS

Choudhary et al., "A Cross-browser web application testing tool", IEEE International Conference on Software Maintenance (ICSM), 2010, Sep. 12-18, 2010, pp. 1-6.

(Continued)

*Primary Examiner* — David Pearson
(74) *Attorney, Agent, or Firm* — Baker Botts L.L.P.

(57) ABSTRACT

Digital fingerprint generation logic executed by a client device includes quirk-exposing logic configured to expose behavioral differences between various system configurations of client devices. The digital fingerprint generation logic queries a remote client device for system configuration, and generates a digital fingerprint of the client device that includes a system configuration characteristic reported by the client device in response to the query. Results of execution of the quirk-exposing logic are compared to expected results that are specific to the reported system configuration. If the results of execution do not match the expected results, the digital fingerprint is determined to have been spoofed.

18 Claims, 6 Drawing Sheets

(56) References Cited

FOREIGN PATENT DOCUMENTS

| | | |
|---|---|---|
| GB | 2 434 724 | 8/2007 |
| GB | 2 355 322 | 4/2011 |
| WO | WO 2011/032605 | 3/2011 |

OTHER PUBLICATIONS

International Search Report and Written Opinion for PCT/US2012/033786, dated Jun. 22, 2012.

* cited by examiner

DETECTION OF SPOOFING OF REMOTE CLIENT SYSTEM INFORMATION

CROSS-REFERENCE TO RELATED APPLICATION

The present application is a continuation of International Application Serial No. PCT/US2012/033786, filed Apr. 16, 2012 and published in English as WO 2012/142584 on Oct. 18, 2012, which claims priority to U.S. Provisional Application Ser. No. 61/476,206, filed Apr. 15, 2011, the contents of which are hereby incorporated by reference in their entireties.

BACKGROUND

1. Field

The disclosed subject matter relates generally to computer security and, more particularly, methods of and systems for detecting spoofing of system information of remotely located client devices.

2. Description of the Related Art

The ubiquity of the Internet and the World Wide Web is reaching into nearly every aspect of people's lives, including those in which privacy and security are paramount. As more and more people use the Internet to conduct banking and to purchase goods, services, and licenses, it has become more and more crucial to guard against false authentication of people transacting via the Internet. Unscrupulous users may attempt to engage in fraudulent on-line business transactions under a false identity, while the more insidious users will attempt to spoof, or mask their identity or the origin of their transactions, by manipulating data or code resident in their computer or transmitted in an outbound message.

In addition, the social, communal nature to which the Internet has evolved requires some policing. Known malicious users are often banned from on-line services. For example, users who post unsolicited advertisements (spam) repeatedly in on-line forums often find themselves banned. Similarly, on-line multi-user computer games often ban "griefers", users who show bad sportsmanship and whose intent appears to be spoiling the gaming experience of other users rather than competing in the proper spirit of the game. These malicious users often try to falsify authentication merely to attempt to appear to be anyone but themselves, rather than trying to appear to be another, specific person.

One approach to prevent false user authentication is to authenticate the client device, such as a personal computer or smart phone, through which a person is authenticated. Such ensures that the person's personal authentication data has not been stolen and used on a different client device. In addition, such device authentication allows device-specific bans, preventing a malicious user from concocting a new identity. One method of authenticating the device is to collect specific information about the device and to combine the information into a digital fingerprint.

In many on-line services, thin clients (e.g., content displayed in a conventional web browser from the server) are often preferable to thick clients (e.g., software installed in the client device). There are a number of reasons for this preference, such as greater user convenience as software installation is not required and the ability to maintain the software—including bug fixes and feature enhancements—at the server in just one location rather than supporting many different versions of the thick client installed in thousands or even millions of client devices.

However, thin clients do not have access to the sort of information included in a client device's digital fingerprint. Due to security concerns, web browsers are designed to limit thin clients' access to just a small portion of the content and hardware of the client device. For example, granting a thin client access to an entire hard drive or other persistent storage device would allow a malicious code to scan the hard drive for passwords and other sensitive information or to destroy information stored on the hard drive. Due to concerns regarding the security risks to the client device, thin clients are simply not permitted to gather enough information from the client device to robustly authenticate it. Generally speaking, any information of the client device to which a thin client would have access could be spoofed.

By spoofing such information about the client device, a malicious user of a client device can masquerade as another user or at least as someone other than herself. What is needed is a way to detect spoofing (i.e., falsification) of system information of the client device.

SUMMARY

In accordance with the disclosed subject matter, digital fingerprint generation logic executed by a client device includes logic configured to expose behavioral differences (sometimes referred to as quirk exposing logic) between various system configurations of client devices. Such behavioral differences include evaluation of mathematical expressions, graphics primitives, cross-browser discrepancies, and logic triggering logic errors in some system configurations.

The digital fingerprint generation logic may operate as a thin client within a browser of a client device being fingerprinted. The digital fingerprint generation logic generates a digital fingerprint of the client device, in part, by querying for device parameters indicative of a particular system configuration, such as the browser type, reported to be running on the device in response to the query. Results of quirk-exposing logic executed by the client device are compared to expected values that are specific to the system configuration being reported. When there is a match, a part of the system configuration of the client device has been verified.

If a result of the quirk-exposing logic does not match an expected value that is based on the system configuration being reported, the system information being reported is determined to be incorrect and perhaps spoofed.

BRIEF DESCRIPTION OF THE DRAWINGS

Other systems, methods, features and advantages of the disclosed subject matter will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features. In the drawings, like reference numerals may designate like parts throughout the different views, wherein:

DETAILED DESCRIPTION

In accordance with the disclosed subject matter, a client device 102 (FIG. 1) yields a digital fingerprint that includes results of browser quirk exposing logic along with other system information to compare the system information of the digital fingerprint to system information of systems with known behavioral quirks.

A quick example is provided. Each of the browsers in common usage today (i.e. Internet Explorer, Mozilla Firefox, Apple Safari, Google Chrome) may provide a slightly different numerical result of the mathematical expression for $log_2 e$, the base-two logarithm of the irrational number e. Such a phenomenon may be referred to as a cross-browser discrepancy. The discrepancy may arise from the fact that each browser, as currently configured, uses different processing logic to represent a mathematical function.

For example, it is known that the function $log_{10}$, when called in Mozilla Firefox version 3.6.8 to calculate $log_{10}(e)$, where e represents Euler's constant 2.718281828459045, will return the value 0.4342944819032518. In contrast, the same function when called in Google Chrome version 10.0.648.204 to calculate $log_{10}(e)$ will return the value 0.43429448190325176. The discrepancy occurs for the fifteenth and sixteenth digits to the right of the decimal point. The foregoing test may be demonstrated, for example, by requesting the web page http://browserspy.dk/math.php using each browser.

Figure 1:
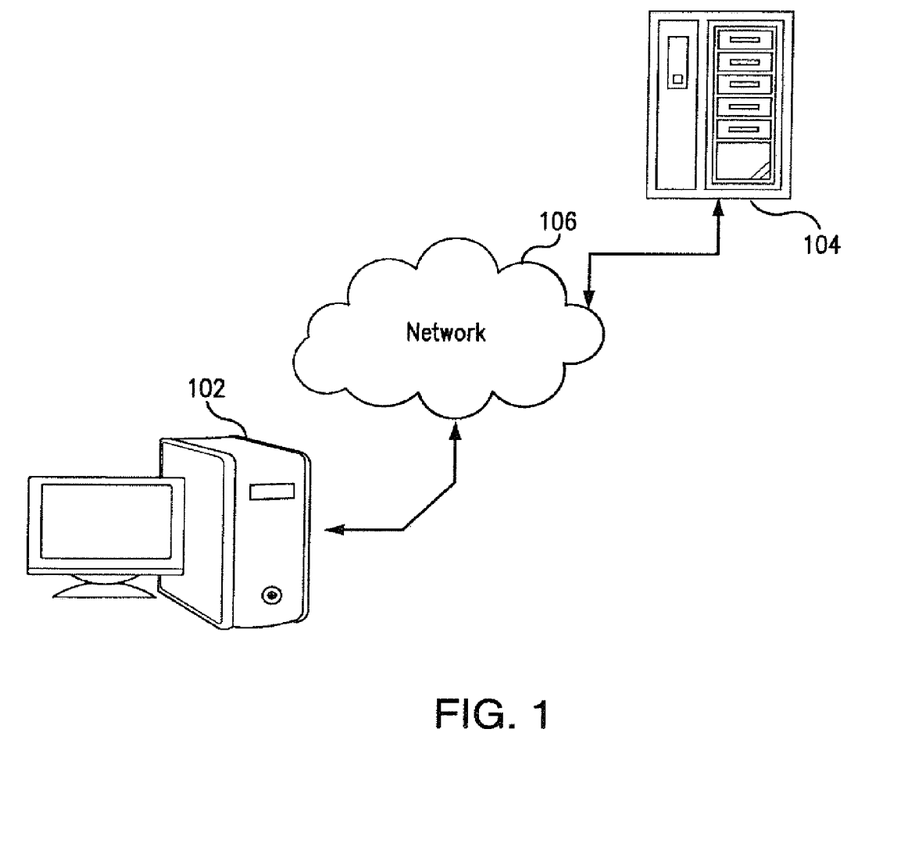
FIG. 1 is a diagram showing a client computer and a server computer that cooperate to detect spoofed system information of the client computer in accordance with one embodiment of the disclosed subject matter.

The discrepancy may be exploited to detect spoofing as follows: if a digital fingerprint yielded by client device 102 includes data indicating use (use data) of the most current version of the Google Chrome browser available from Google Inc. of Mountain View, Calif. but also includes the numerical result (result data) of the mathematical expression, $log_{30}(e)$, produced by the most current version of the Firefox browser available from the Mozilla Foundation of Mountain View, Calif., which is known to produce a different value for $log_{10}(e)$ than Google Chrome, then the digital fingerprint is determined to be invalid since the information identifying the browser executing within client device 102 appears to be spoofed and is at least inaccurate. A test to detect the discrepancy could be coded in many ways, for example, by a difference operation that compares the result data to a check value, i.e. a result known to be produced by the browser identified in the use data, and checks the comparison for a difference other than zero.

FIG. 1 shows client device 102 connected to a server 104 through a wide area network 106 such as the Internet. Client computer 102 is a computing device such as a personal computer or a smart phone or personal digital assistant (PDA) and includes a browser for accessing on-line services such as those provided by server 104. Server 104 provides on-line services by responding to requests received from client device 102 through wide area network 106 by sending data, which can include logic to be executed by client device 102, for processing by client device 102.

Figure 2:
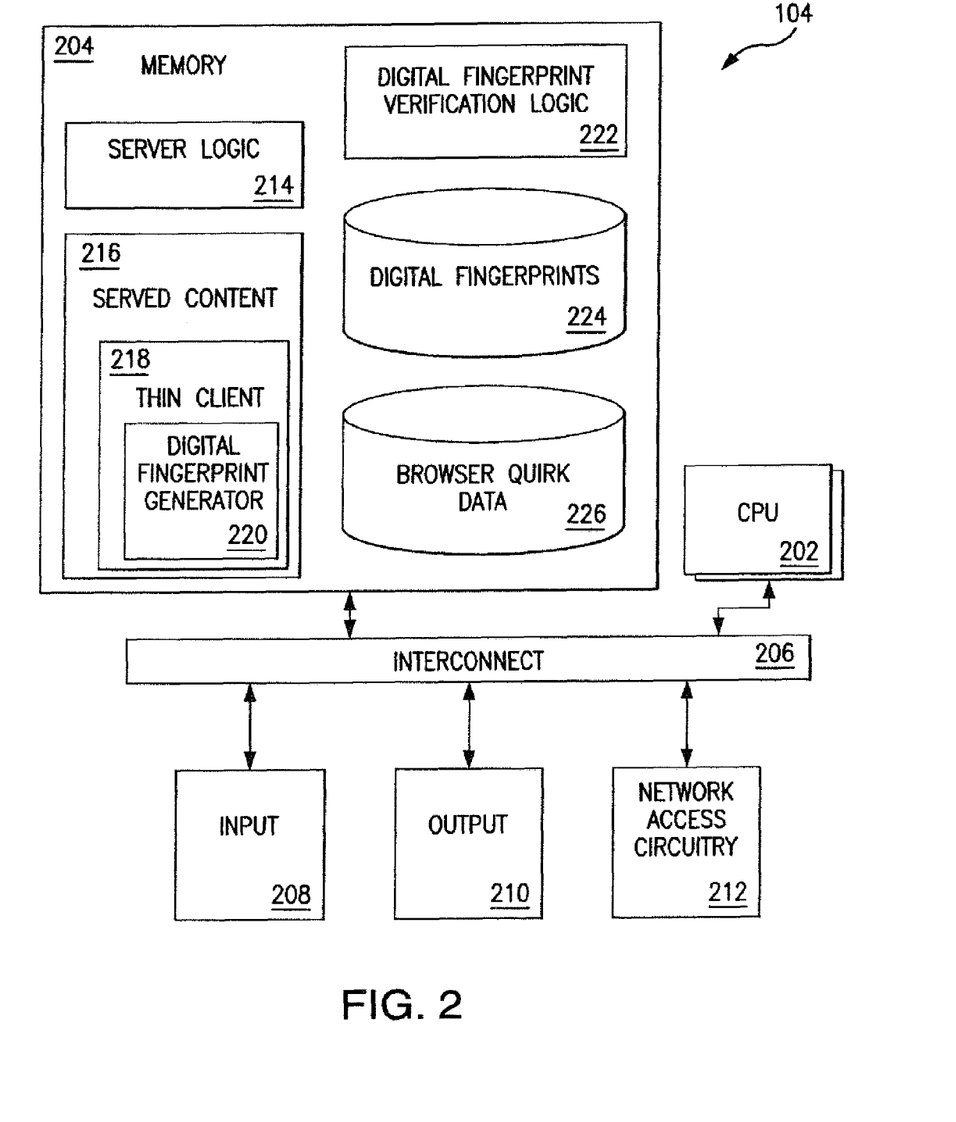
FIG. 2 is a block diagram showing the server computer of FIG. 1 in greater detail.

With reference to FIG. 2, Server 104 includes one or more microprocessors 202 (collectively referred to as CPU 202) that retrieve data and/or instructions from memory 204 and execute retrieved instructions in a conventional manner. Memory 204 can include generally any computer-readable medium including, for example, persistent memory such as magnetic and/or optical disks, ROM, and PROM, and volatile memory such as RAM.

CPU 202 and memory 204 are connected to one another through a conventional interconnect 206, which is a bus in this illustrative embodiment and which connects CPU 202 and memory 204 to one or more input devices 208, output devices 210, and network access circuitry 212. Input devices 208 can include, for example, a keyboard, a keypad, a touch-sensitive screen, a mouse, and a microphone. Output devices 210 can include, for example, a display—such as a liquid crystal display (LCD)—and one or more loudspeakers. Being a server computer system, input devices 208 and output devices 210 can be omitted. Network access circuitry 212 sends and receives data through wide area network 106 (FIG. 1) such as the Internet and/or mobile device data networks.

A number of components of server 104 are stored in memory 204. In particular, server logic 214 and digital fingerprint verification logic 222 are each all or part of one or more computer processes executing within CPU 202 from memory 204 in this illustrative embodiment but can also be implemented using digital logic circuitry. As used herein, "logic" refers to (i) logic implemented as computer instructions and/or data within one or more computer processes, and/or (ii) logic implemented in electronic circuitry. Served content 216, digital fingerprints 224, and browser quirk database data 226 are each data stored persistently in memory 204. In this illustrative embodiment, digital fingerprints 224 and browser quirk database data 226 are each organized as a database.

Served content 216 includes data sent by server logic 214 in response to queries received through wide area network 106 (FIG. 1), e.g., resource requests from client device 102. Served content 216 (FIG. 2) includes a thin client 218 that in turn includes a digital fingerprint generator 220. Thin client 218 is executable logic that executes within a browser executing within client device 102. The serving of thin client logic and execution thereof by a remote client device is known and is not described further herein.

Digital fingerprint generator 220 comprises logic that is executed by client device 102 (FIG. 1) to generate a digital fingerprint of client device 102. Except as otherwise described herein, digital fingerprint generator 220 generates a digital fingerprint of client device 102 in the manner described in U.S. patent application Ser. No. 12/903,991 filed Oct. 13, 2010 for "Computer and Hardware Identity Tracking Using Characteristic Parameter-Derived Data" (the '991 Application) and in U.S. Patent Application 61/410,815 filed Nov. 5, 2010 for "Incremental Browser-Based Device Fingerprinting" (the '815 Application) which are fully incorporated herein by reference. A device fingerprint so generated is said to be yielded by the device.

Digital fingerprints 224 include digital fingerprints of known client devices and includes data indicating various aspects of each digital fingerprint, e.g., whether each digital fingerprint is trusted and to which on-line services provided by server logic 214 each digital fingerprint grants access.

Browser quirk data 226 identifies quirks of each of a number of known browsers that can be used by client devices. As used herein, a quirk is a behavior of client devices that differs across various configurations of client devices in response to a common input. Such quirks include specific numerical quirks as well as graphical quirks and deviations or discrepancies in implemented protocols and standards. Numerical quirks may result from differences in the numerical approximation logic used by each browser type to approximate numbers having lengthy decimal representations, such as irrational numbers. One example is given above as the $\log_{10}(e)$ discrepancy. As other examples, each browser type may provide slightly different numerical results when representing pi or the square root of two, or when running a calculation involving an irrational number. Graphical quirks result from differences in graphics logic used by each browser type. For example, a box drawing primitive in a given browser type may result in a drawn box of slightly different dimensions.

Many deviations in implementation of standards are known and documented. For example, "Jscript Deviations from ES3", by Pratap Lakshman of Microsoft Corporation (Draft, Sep. 24, 2007) identifies numerous deviations of various browser types in their respective implementations of the ECMAScript $3^{rd}$ Edition Specification.

In addition to all these, each version of each browser type has known and documented bugs or logic errors.

In addition to the browser itself, other types of system information of client device 102 can be directly detected. For example, system information in the digital fingerprint can indicate the presence and readiness of various plugins of the browser and of various fonts. Plugins are adjunct logic that can be applied to a browser to augment its functionality. Fonts specify a particular style or appearance of text when rasterized for graphical representation to the user.

The presence of plugins can be detected directly by testing the functionality purportedly added by each plugin and for testing for known bugs and other implementation peculiarities. The presence of specific fonts can be detected directly by comparing resulting dimensions of predetermined text in a specific font to expected dimensions.

Figure 3:
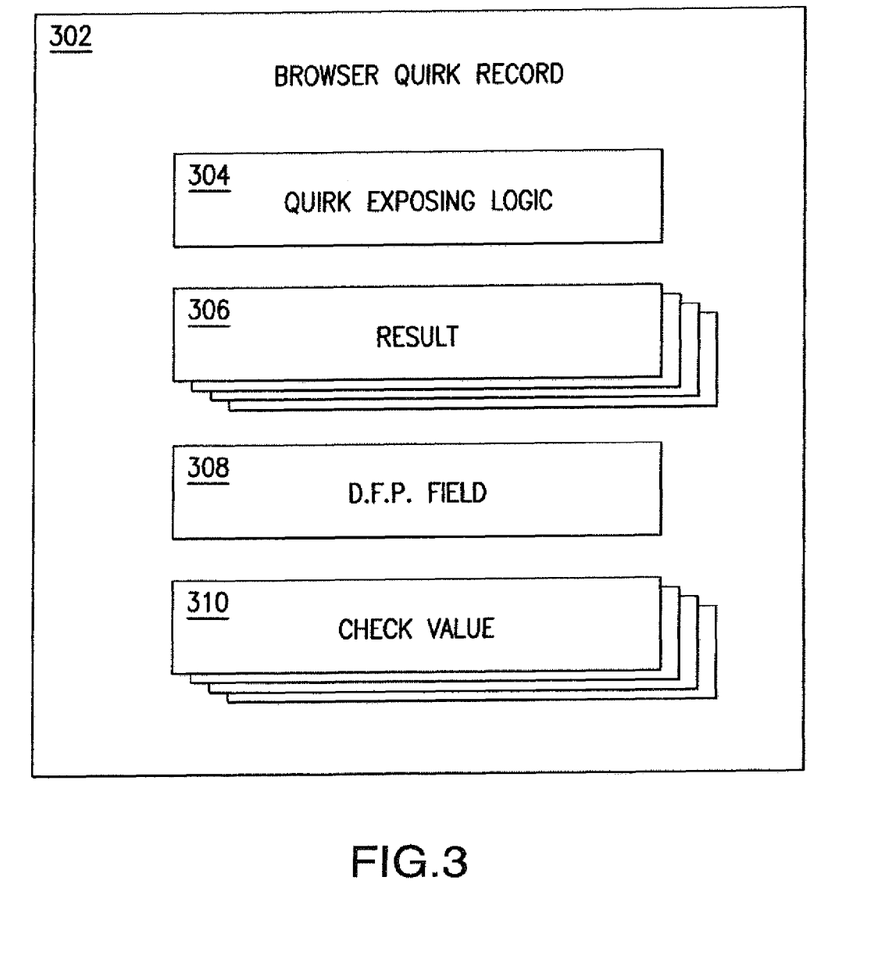
FIG. 3 is a block diagram of a quirk record used by the server computer of FIG. 2 to detect spoofed system information from the client computer of FIG. 1.

Each quirk for which digital fingerprint generator 220 tests and that is checked by digital fingerprint verification logic 222 is represented in browser quirk data 226 in a browser quirk record 302 (FIG. 3).

Quirk exposing logic 304 is logic to be executed by client device 102 to expose the particular quirk represented by browser quirk record 302, which is sometimes referred to as the subject quirk in the context of FIG. 3. The following pseudo-code is illustrative.

```
digital_fingerprint_text← "<log_10_e>"             (1)
digital_fingerprint_text← Math.LOG10E
digital_fingerprint_text← "</log_10_e>"
```

In this very simple example of pseudo-code (1), the numerical result of $\log_{10}(e)$ is included in the resulting digital fingerprint text between. XML tags "<log_10_e>" and "/log_10_e>". Thus, quirk exposing logic 304 produces data that can expose the subject quirk and includes that data in the digital fingerprint such that it can be recognized and parsed out later.

Browser quirk record 302 includes one or more results 306, each of which is a predetermined result expected of quirk exposing logic 304 in various environments in client device 102.

Digital fingerprint field 308 identifies a particular data field of a digital fingerprint that the subject quirk is intended to verify. For example, if the subject quirk is to verify the particular type or version of the browser itself, digital fingerprint field 308 identifies a user agent field in the digital fingerprint in which the user agent data of the browser is stored. Other examples of digital fingerprint field 308 include a digital fingerprint field describing installed fonts available to the browser of client device 102 and a digital fingerprint field specifying installed plugins available to the browser of client device 102.

Browser quirk record 302 includes one or more check values 310, each corresponding to a respective one of results 306. For a digital fingerprint to be valid, its field identified by digital fingerprint field 308 must match the check value 310 corresponding to the result 306 matched by the result of quirk exposing logic 304. The following pseudo-code is illustrative.

```
if ResultOfQuirkExposingLogic304 matches Result306ᵢ then    (2)
    unless DigitalFingerprint.DFPfield308 matches
    Check Value310ᵢ then
        DigitalFingerprint is invalid
    end
end
```

It should be noted that the subscript "i" in pseudo-code (2) indicates an association of a given one of results 306 with a given one of check values 310.

To illustrate, consider that the subject quirk is the numerical result of the mathematical expression, $\log_{10}(e)$. To expose this quirk, quirk exposing logic 304 is generally as described above with respect to pseudo-code (1). Each of results 306 specifies the expected numerical result for each of a number of browser types. Digital fingerprint field 308 specifies the user agent reported by the browser of client device 102 and included in the digital fingerprint as the relevant field. Each of check values 310 is a regular expression that matches all user agents of browser types that produce the numerical result of a respective one of results 306.

One of results 306 specifies the numerical result of $\log_{10}(e)$ returned by the Google Chrome browser, and the corresponding check value 310 is a regular expression that matches all user agents reported by all versions of the Google Chrome browser. Another of results 306 specifies the numerical result of $\log_{10}(e)$ returned by the Firefox (Gecko-based) browser, and the corresponding check value 310 is a regular expression that matches all user agents reported by all versions of all Gecko-based browsers. Other corresponding pairs of results 306 and check values 310 represent expected numerical results and corresponding expected user agent data of other browser types.

Thus, browser quirk record 302 includes logic to expose the subject quirk and data by which spoofing of system information included in a digital fingerprint can be detected.

Logic flow diagram 400 (FIG. 4) illustrates the serving of thin client 218 in a manner that exposes quirks for verification of a digital fingerprint in accordance with the disclosed subject matter. Loop step 402 and next step 406 define a loop in which server logic 214 performs step 404 for each of the browser quirk records stored in browser quirk data 226 (FIG. 2).

In step 404 (FIG. 4), server logic 214 includes quirk exposing logic 304 (FIG. 3) of the particular browser quirk record processed in the current iteration of the loop of steps 402-406 (FIG. 4) into digital fingerprint generator 220 (FIG. 2).

After all browser quirk records of browser quirk data 226 have been processed according to the loop of steps 402-406, digital fingerprint generator 220 is configured to test for all known quirks. This portion of logic flow diagram 400 (FIG. 4) can be performed once and ahead of time to thus configure digital fingerprint generator 220.

Figure 4:
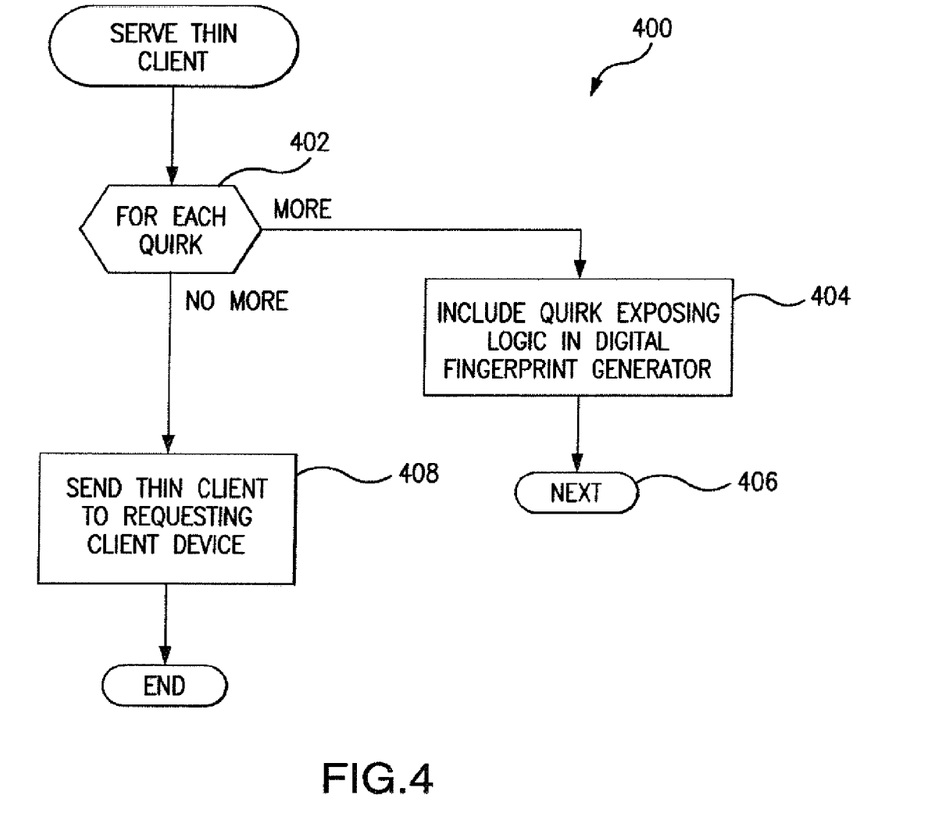
FIG. 4 is a logic flow diagram illustrating integration of quirk exposing logic into content served by the server computer of FIG. 1 to the client computer of FIG. 1.

In step 408, server logic 214 serves the request received from client device 102 (FIG. 1) by sending served content 216

(FIG. 2), including thin client 218 and in turn including digital fingerprint generator 220 as configured according to the loop of steps 402-406.

When thin client 218 and therefore digital fingerprint generator 220 is executed by client device 102 (FIG. 1), client device 102 is queried for information identifying a system configuration of the client device, and in response reports a feature of its system configuration, which feature may be captured in a field of a digital fingerprint generated by digital fingerprint generator 220. Client device 102 sends the generated digital fingerprint to server logic 214 (FIG. 2) of server 108. Server logic 214 sends the digital fingerprint to digital fingerprint verification logic 222 to verify the digital fingerprint.

Logic flow diagram 500 (FIG. 5) illustrates the verification of the digital fingerprint by digital fingerprint verification logic 222.

Figure 5:
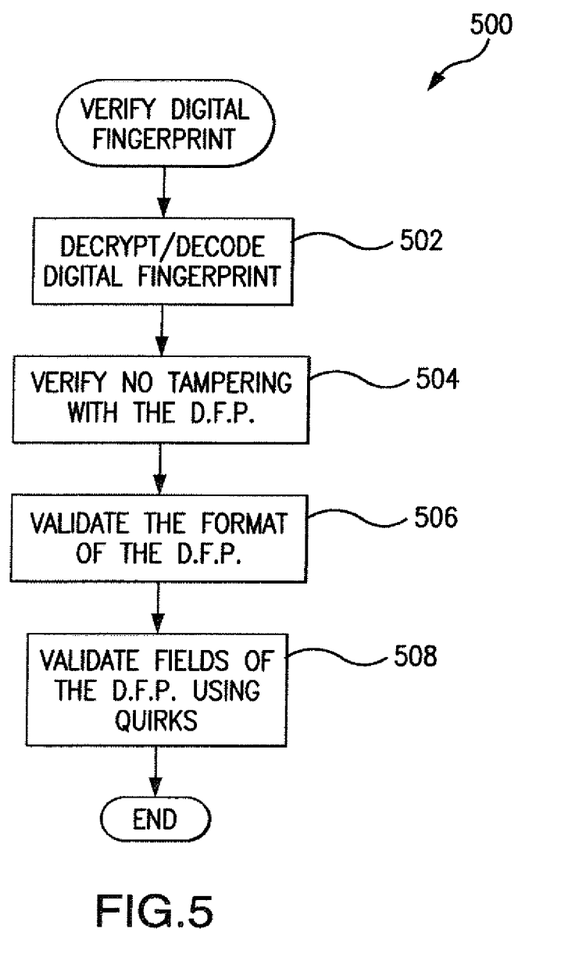
FIG. 5 is a logic flow diagram illustrating the verification of a digital fingerprint received by the server computer of FIG. 2 in accordance with the disclosed subject matter.

In step 502, digital fingerprint verification logic 222 decrypts or decodes the digital fingerprint. In step 504, digital fingerprint verification logic 222 verifies that the digital fingerprint has not been improperly modified or tampered. In step 506, digital fingerprint verification logic 222 validates that the format of the digital fingerprint is the format expected by digital fingerprint verification logic 222. Steps 502-506 are described in more detail in the '991 and the '815 Applications, which are fully incorporated herein by reference.

Figure 6:
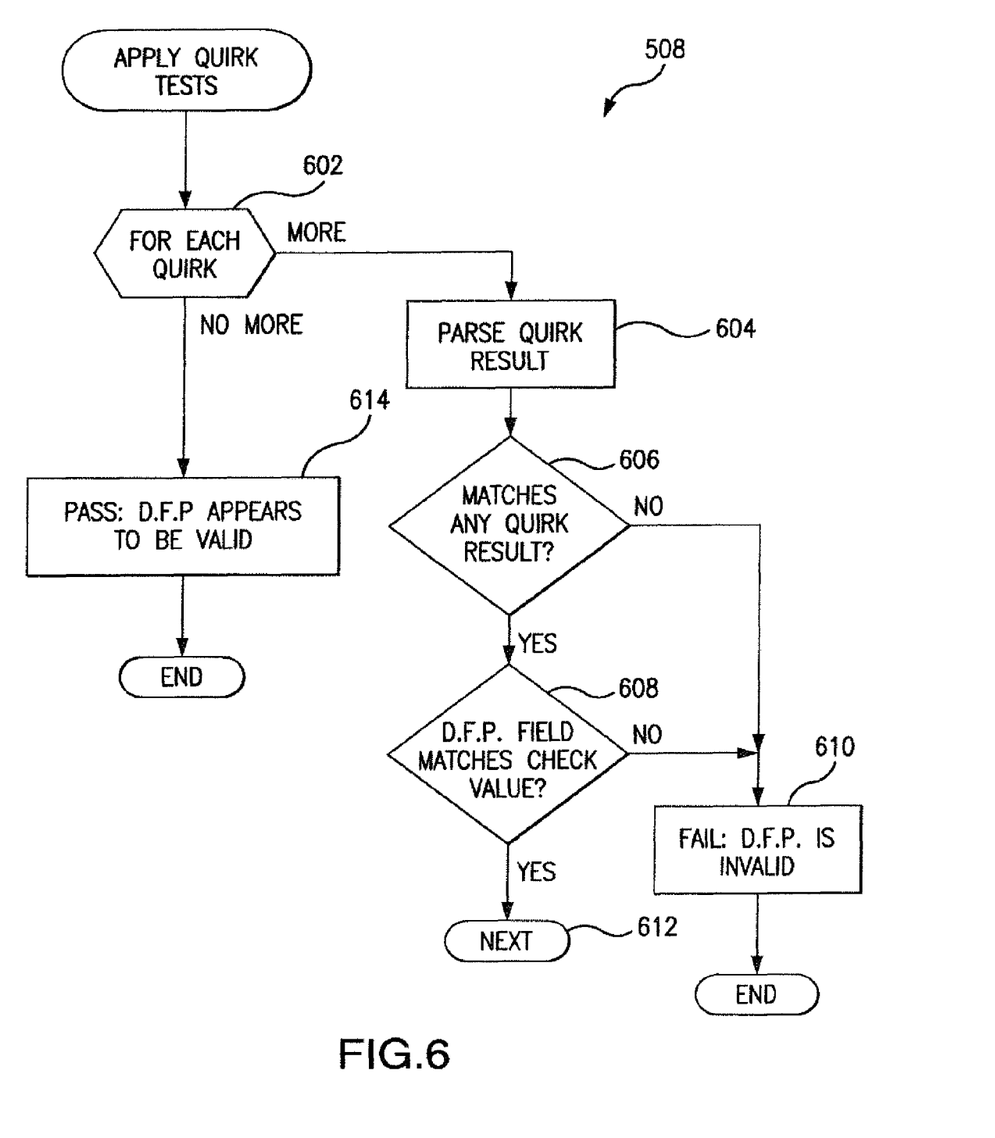
FIG. 6 is a logic flow diagram illustrating a step of the logic flow diagram of FIG. 5 in greater detail.

In step 508, digital fingerprint verification logic 222 validates specific fields of the digital fingerprint using results of quirk exposing logic incorporated into digital fingerprint generator 220 as described above. Step 508 is shown in greater detail as logic flow diagram 508 (FIG. 6).

Loop step 602 and next step 612 define a loop in which digital fingerprint verification logic 222 performs steps 604-610 for each of the browser quirk records stored in browser quirk data 226 (FIG. 2). During an iteration of the loop of steps 602-612, the particular browser quirk record is sometimes referred to as the subject browser quirk record and the quirk thereof is sometimes referred to as the subject quirk in the context of logic flow diagram 508.

In step 604, digital fingerprint verification logic 222 parses the result embedded in the digital fingerprint by execution of the quirk exposing logic of the subject browser quirk record incorporated into digital fingerprint generator 220. In one embodiment, the results are included in XML format as shown above with respect to pseudo-code (1). Parsing of XML fields is known and is not described herein.

In test step 606, digital fingerprint verification logic 222 determines whether the parsed result matches any of results 306 (FIG. 3) of the subject browser quirk record. If not, processing transfers to step 610 in which digital fingerprint verification logic 222 determines that the digital fingerprint is invalid. In essence, failure to find any result in the digital fingerprint indicates that the subject browser quirk record is not applicable to the particular browser environment of client device 102. In an alternative embodiment, failure to find a result for the subject browser quirk record is considered indeterminative and processing by digital fingerprint verification logic 222 transfers from test step 606 to next step 612 in which the next browser quirk record is processed by digital fingerprint verification logic 222 according to the loop of steps 602-612.

Conversely, if the result parsed by digital fingerprint verification logic 222 in step 604 matches one of results 306 (FIG. 3) of the subject browser quirk record, processing transfers from test step 606 (FIG. 6) to test step 608.

In test step 608, digital fingerprint verification logic 222 determines whether the field of the digital fingerprint identified by digital fingerprint field 308 (FIG. 3) of the subject browser quirk record matches the one of check values 310 that corresponds to the matched one of results 306. As described above, the check value can be a regular expression. For example, the regular expression /MozillaV5\.0.*/ would match all user agent data reported by browsers based on version 5.0 of the Mozilla browser engine. Regular expressions and their matching are well known and not described herein.

If digital fingerprint verification logic 222 determines that the field of the digital fingerprint identified by digital fingerprint field 308 (FIG. 3) of the subject browser quirk record matches the one of check values 310 that corresponds to the matched one of results 306, processing transfers through next step 612 to loop step 602 and the next browser quirk record is processed by digital fingerprint verification logic 222 in the loop of steps 602-612.

Conversely, if digital fingerprint verification logic 222 determines that the field of the digital fingerprint identified by digital fingerprint field 308 (FIG. 3) of the subject browser quirk record does not match the one of check values 310 that corresponds to the matched one of results 306, processing transfers to step 610 in which digital fingerprint verification logic 222 determines that the digital fingerprint is invalid. Accordingly, mismatching of a result and its corresponding check value of any browser quirk record is interpreted as spoofed system information that results in invalidation of the digital fingerprint.

If digital fingerprint verification logic 222 processes all of the browser quirk records of browser quirk data 226 (FIG. 2) without detecting any mismatches between results and check values triggering performance of step 610, processing transfers from loop step 602 to step 614 in which digital fingerprint verification logic 222 determines that the digital fingerprint appears to be valid and authentic, i.e., not spoofed.

After step 610 or step 614, processing according to logic flow diagram 508, and therefore step 508 (FIG. 5), completes.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for detecting spoofing of system information reported by a remote client device, the method comprising steps for:
   querying the remote client device for system information identifying a system configuration of the remote client device;
   receiving in response to the querying step a reported system configuration;
   causing the remote client device to execute exposing logic configured to induce an expected result characteristic of the reported system configuration, wherein the expected result characteristic is based on processing of a common input by the exposing logic and will vary as a result of the system configuration of the remote client device;
   identifying a result of execution of the exposing logic by the remote client device; and
   determining that the system information is incorrect upon a condition in which the result of execution does not match the expected result.

2. The method of claim 1 wherein the system information includes a user agent that is reported by a browser executing in the remote client device.

3. The method of claim 1 wherein the exposing logic causes the remote client device to evaluate a mathematical expression and wherein the expected result includes a numerical value.

4. The method of claim 1 wherein the exposing logic is configured to cause execution of a function known to generate a particular error when executed within the reported system configuration.

5. The method of claim 1 wherein the expected result includes a regular expression.

6. The method of claim 1 wherein the reported system configuration is captured in a digital fingerprint.

7. A non-transitory computer readable medium useful in association with a computer which includes one or more processors and a memory, the computer readable medium including computer instructions which are configured to cause the computer, by execution of the computer instructions in the one or more processors from the memory, to detect incorrect system information about a remote client device by at least:

querying the remote client device for system information identifying a system configuration of the remote client device;

receiving in response to the querying step a reported system configuration;

causing the remote client device to execute exposing logic configured to induce an expected result characteristic of the reported system configuration, wherein the expected result characteristic is based on processing of a common input by the exposing logic and will vary as a result of the system configuration of the remote client device;

identifying a result of execution of the exposing logic by the remote client device; and     determining that the system information is incorrect upon a condition in which the result of execution does not match the expected result.

8. The computer readable medium of claim 7 wherein the system information includes a user agent that is reported by a browser executing in the remote client device.

9. The computer readable medium of claim 7 wherein the exposing logic causes the remote client device to evaluate a mathematical expression and wherein the expected result includes a numerical value.

10. The computer readable medium of claim 7 wherein the exposing logic is configured to cause execution of a function known to generate a particular error when executed within the reported system configuration.

11. The computer readable medium of claim 7 wherein the expected result includes a regular expression.

12. The computer readable medium of claim 7 wherein the reported system configuration is captured in a digital fingerprint.

13. A computer system comprising:

at least one microprocessor;

a computer readable medium that is operatively coupled to the microprocessor; and     a server logic that (i) executes in the microprocessor from the computer readable medium and (ii) when executed by the microprocessor, causes the computer to detect incorrect system information about a remote client device by at least:

querying the remote client device for system information identifying a system configuration of the remote client device;

receiving in response to the querying step a reported system configuration;

causing the remote client device to execute exposing logic configured to induce an expected result characteristic of the reported system configuration, wherein the expected result characteristic is based on processing of a common input by the exposing logic and will vary as a result of the system configuration of the remote client device;

identifying a result of execution of the exposing logic by the remote client device; and         determining that the system information is incorrect upon a condition in which the result of execution does not match the expected result.

14. The computer system of claim 13 wherein the system information includes a user agent that is reported by a browser executing in the remote client device.

15. The computer system of claim 13 wherein the exposing logic causes the remote client device to evaluate a mathematical expression and further wherein the result includes a numerical value.

16. The computer system of claim 13 wherein the exposing logic is configured to cause execution of a function known to generate a particular error when executed within the reported system configuration.

17. The computer system of claim 13 wherein the expected result includes a regular expression.

18. The computer system of claim 13 wherein the reported system configuration is captured in a digital fingerprint.

\* \* \* \* \*